United States Patent
Rheaume et al.

(10) Patent No.: US 11,628,393 B2
(45) Date of Patent: Apr. 18, 2023

(54) VACUUM ASSISTED AIR SEPARATION MODULE OPERATION

(71) Applicant: Hamilton Sundstrand Corporation, Charlotte, NC (US)

(72) Inventors: Jonathan Rheaume, West Hartford, CT (US); Haralambos Cordatos, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/410,236

(22) Filed: Aug. 24, 2021

(65) Prior Publication Data

US 2021/0379527 A1    Dec. 9, 2021

Related U.S. Application Data (62) Division of application No. 15/925,405, filed on Mar. 19, 2018, now Pat. No. 11,123,687.

(51) Int. Cl.
*B01D 53/22* (2006.01)
*B01D 51/10* (2006.01)
(Continued)

(52) U.S. Cl.
CPC .............. *B01D 53/22* (2013.01); *A62C 3/065* (2013.01); *A62C 99/0018* (2013.01); *B01D 51/10* (2013.01); *B01D 53/30* (2013.01); *B64D 37/32* (2013.01); *C01B 21/0438* (2013.01); *A62C 3/08* (2013.01); *B01D 53/228* (2013.01);
(Continued)

(58) Field of Classification Search
CPC ............ B01D 51/10; B01D 2259/4575; B01D 2256/10; B01D 2257/104; B01D 53/22; B01D 2053/221; B01D 53/228; B01D 53/30; B60K 2015/03381; A62C 3/08; A62C 99/0018; A62C 3/065; B64D 37/32; C01B 21/0438
See application file for complete search history.

(56) References Cited

U.S. PATENT DOCUMENTS 3,078,670 A * 2/1963 Werner ..................... F02C 9/26
416/42
3,847,298 A   11/1974 Hamilton
(Continued)

FOREIGN PATENT DOCUMENTS

EP    3118121 A1    1/2017
GB    2397821 A    8/2004
(Continued)

OTHER PUBLICATIONS

Perry "Perry's Chemical Engineeer's Handbook", p. 22-67, 1999, The McGraw-Hill Companies, Inc. (Year: 1999).*
(Continued)

*Primary Examiner* — Anthony R Shumate
(74) *Attorney, Agent, or Firm* — Kinney & Lange P.A.

(57) ABSTRACT

A method of fuel tank inerting includes separating process air into nitrogen-enriched air and oxygen-enriched air with an air separation membrane. A vacuum is applied to the air separation membrane to produce a pressure differential across the air separation membrane. The vacuum is manipulated to vary the pressure differential and vary purity of the nitrogen-enriched air.

10 Claims, 5 Drawing Sheets

(51) Int. Cl.
  *B01D 53/30* (2006.01)
  *B64D 37/32* (2006.01)
  *A62C 99/00* (2010.01)
  *A62C 3/06* (2006.01)
  *C01B 21/04* (2006.01)
  *A62C 3/08* (2006.01)
  *B60K 15/03* (2006.01)

(52) U.S. Cl.
  CPC .... *B01D 2053/221* (2013.01); *B01D 2256/10* (2013.01); *B01D 2257/104* (2013.01); *B01D 2259/4575* (2013.01); *B60K 2015/03381* (2013.01)

(56) References Cited

U.S. PATENT DOCUMENTS

| | | | |
|---|---|---|---|
| 3,848,806 A | | 11/1974 | Samuelsen et al. |
| 4,556,180 A | | 12/1985 | Manatt |
| 4,560,394 A | * | 12/1985 | McDonald ................ F02C 6/10 |
| | | | 96/4 |
| 4,595,344 A | | 6/1986 | Briley |
| 4,750,127 A | * | 6/1988 | Leslie .................. G05D 1/0005 |
| | | | 701/16 |
| 6,510,564 B1 | * | 1/2003 | Karlsson .............. B61D 35/007 |
| | | | 4/431 |
| 7,175,692 B2 | | 2/2007 | Schwalm |
| 7,300,494 B2 | | 11/2007 | Schwalm et al. |
| 7,445,659 B2 | | 11/2008 | Schwalm |
| 7,565,797 B2 | | 7/2009 | Nyberg et al. |
| 8,801,831 B1 | | 8/2014 | Snow et al. |
| 9,175,688 B2 | | 11/2015 | Neel |
| 9,211,954 B2 | | 12/2015 | Barkowsky |
| 9,752,801 B2 | | 9/2017 | Verma et al. |
| 2003/0098314 A1 | | 5/2003 | Phelps et al. |
| 2003/0177912 A1 | | 9/2003 | McGuire et al. |
| 2004/0025507 A1 | * | 2/2004 | Leigh .................... B64D 37/32 |
| | | | 123/563 |
| 2004/0226438 A1 | | 11/2004 | Jones |
| 2005/0115404 A1 | | 6/2005 | Leigh et al. |
| 2005/0247197 A1 | * | 11/2005 | Snow .................... B64D 37/32 |
| | | | 95/138 |
| 2006/0230935 A1 | | 10/2006 | Michael et al. |
| 2008/0017045 A1 | | 1/2008 | McGuire |
| 2008/0060523 A1 | | 3/2008 | Tom et al. |
| 2011/0059377 A1 | | 3/2011 | Scotto et al. |
| 2012/0145417 A1 | | 6/2012 | Anselm et al. |
| 2014/0326021 A1 | | 11/2014 | Wagner |
| 2014/0342648 A1 | | 11/2014 | Hart et al. |
| 2015/0121909 A1 | * | 5/2015 | Koenig ................. B64D 13/06 |
| | | | 62/61 |
| 2016/0052639 A1 | | 2/2016 | Burnell et al. |
| 2018/0235247 A1 | | 8/2018 | Kamei et al. |
| 2018/0353897 A1 | | 12/2018 | Yamamoto et al. |
| 2019/0232235 A1 | | 8/2019 | Takahashi et al. |
| 2019/0336906 A1 | | 11/2019 | Ji et al. |

FOREIGN PATENT DOCUMENTS

| | | |
|---|---|---|
| JP | 2002035530 A | 2/2002 |
| WO | 2016034298 A1 | 3/2016 |

OTHER PUBLICATIONS

Communication Pursuant to Article 94(3) EPC for EP Application No. 19163766.9, dated Jul. 13, 2020, pp. 4.

Extended European Search Report for EP Application No. 19163766.9, dated Jul. 18, 2019, pp. 8.

* cited by examiner

VACUUM ASSISTED AIR SEPARATION MODULE OPERATION

CROSS-REFERENCE TO RELATED APPLICATION(S)

This application is a divisional of U.S. application Ser. No. 15/925,405 filed Mar. 19, 2018 for "VACUUM ASSISTED AIR SEPARATION MODULE OPERATION" by J. Rheaume and H. Cordatos.

BACKGROUND

This application relates generally to fuel tank inerting systems, and specifically to air separation module fuel tank inerting systems.

Fuel tanks can contain potentially combustible combinations of oxygen, fuel vapors, and ignition sources. In order to prevent combustion in aircraft fuel tanks, commercial aviation regulations require actively managing the risk of explosion in ullage of fuel tanks; this is typically accomplished by decreasing the oxygen partial pressure in the ullage in fuel tanks to less than 12%, or less than 9% for military vehicles.

Conventional fuel tank inerting systems use air separation modules that separate out oxygen and humidity from incoming bleed air, generating nitrogen-enriched air (inert gas) to fill the ullage of the fuel tank. However, the pressure of bleed air used in air separation modules creates a number of system problems, particularly during aircraft descent.

SUMMARY

In one embodiment, a fuel tank inerting system includes an air separation module having an oxygen permeable membrane that separates process air into nitrogen-enriched air and oxygen-enriched air, a variable vacuum source configured to produce a pressure differential across the oxygen permeable membrane, and a controller for controlling the variable vacuum source to provide the pressure differential such that a desired purity of the nitrogen-enriched air is produced.

In another embodiment, a method of fuel tank inerting includes separating process air into nitrogen-enriched air and oxygen-enriched air with an air separation membrane, applying a vacuum to the air separation membrane to produce a pressure differential across the air separation membrane, and manipulating the vacuum to vary the pressure differential and vary purity of the nitrogen-enriched air.

DETAILED DESCRIPTION

Air separation modules are used in aircraft for fuel tank inerting and have been proposed for fire suppression or other purposes. However, air separation modules require the use of compressed air to run, such as bleed air extracted from an engine compressor. Thus, air separation modules function chiefly when the aircraft engines are running and producing bleed air which can be routed to air separation module systems. The times at which an air separation module can be run, then, are restricted by the function of the engines on an aircraft, and the flight phase.

Air separation modules rely on oxygen permeable membranes to produce inert gas from bleed air. In most air separation modules, compressed air is fed into a module containing such a membrane, and oxygen permeates the membrane to produce oxygen-enriched air (OEA) on one side of the membrane, leaving inert nitrogen-enriched air (NEA) on the other side. Typically, the NEA is routed to the fuel tank while the OEA is dumped overboard. Air separation module membranes function based on a pressure differential. Oxygen permeates the membrane due to the difference in partial pressure of oxygen. Thus, changing the partial pressure of oxygen on the permeate side of the air separation module membrane can allow oxygen to permeate the membrane more extensively, and allow better performance of the air separation module under various conditions.

Figure 1:
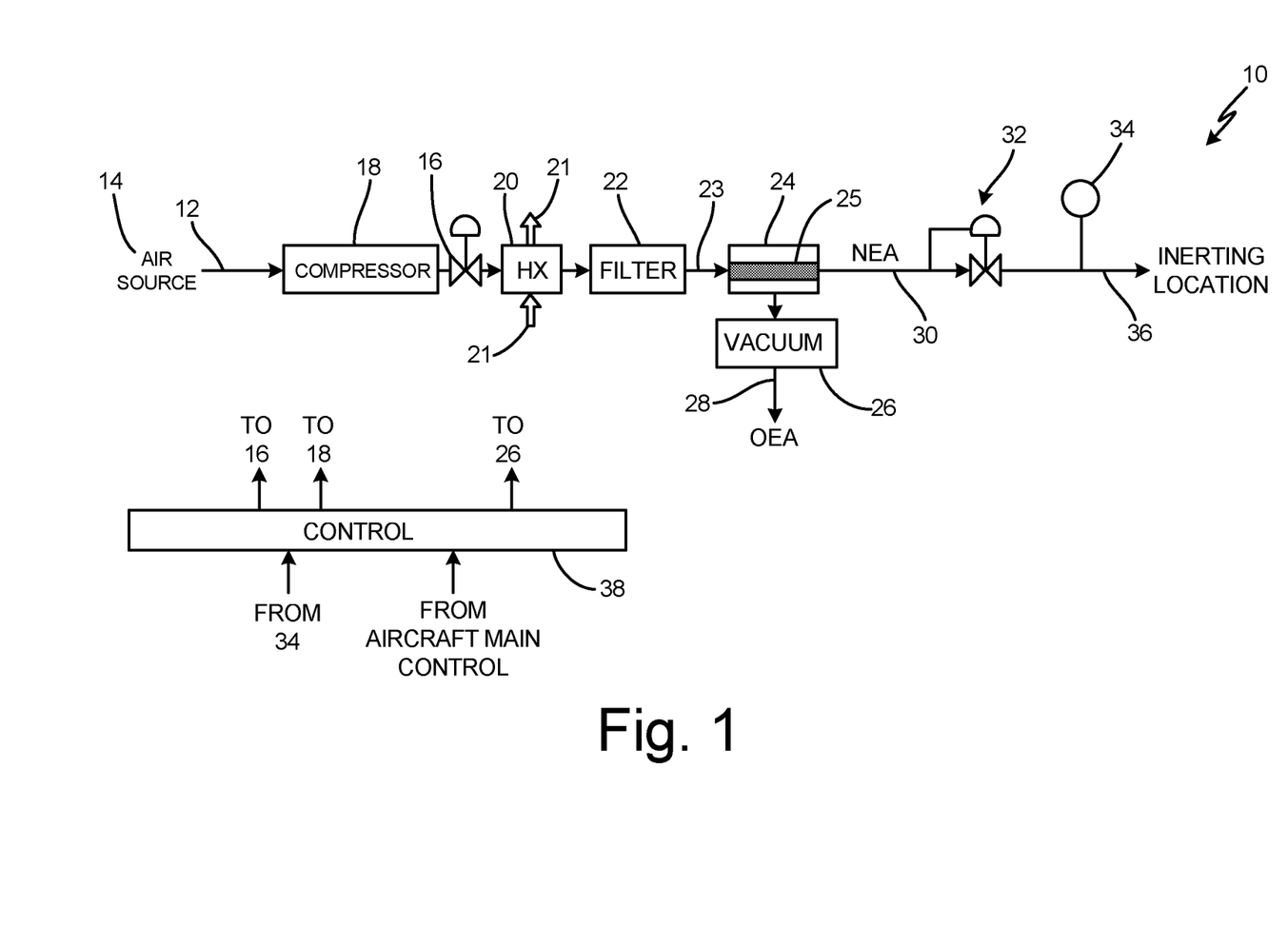
FIG. 1 is a schematic diagram of a variable vacuum assisted fuel tank inerting system.

FIG. 1 is a schematic diagram of fuel tank inerting system 10. Fuel tank inerting (FTI) system 10 includes inlet 12, air source 14, compressor 18, actuated valve 16, heat exchanger 20, filter 22, air separation module (ASM) 24, variable vacuum source 26, oxygen-enriched air outlet 28, nitrogen-enriched air line 30, pressure regulator 32, oxygen sensor 34, inert gas outlet 36, and controller 38.

Air source 14 can provide bleed air, ram air, or other compressible air as a source of process air to system 10. Air from air source 14 is drive forward by compressor 18. Compressor 18 can be a fan, blower, compressor stage, or other mechanical means of moving air from air source 14 towards ASM 24. Typically, process air must be compressed by compressor 18 prior to entering ASM 24 so that incoming process air is sufficiently pressurized for gas separation.

Downstream of compressor 18, actuated valve 16 regulates the flow of process air to ASM 24. Actuated valve 16 may be configured for operation fully opened or fully closed such as is the case with a solenoid valve, or alternatively actuated valve 16 may throttle flow (e.g., a butterfly valve). Actuated valve 16 can be, for example, operated by a motor or by a solenoid.

Incoming process air is further conditioned by heat exchanger 20, which temperature regulates air coming into ASM 24. Heat exchanger 20 can, for example, cool compressed bleed air coming into system 10. Heat exchanger 20 can be a plurality of heat exchangers, such as pre-cooler and fuel tank inerting heat exchangers as known to those practiced in the art. Heat exchanger 20 is an air-to-air heat exchanger, such as a plate-fin heat exchanger or a shell and tube heat exchanger. Cooling air 21 (for example, fan air or ram air) flows through heat exchanger 20 to cool the supply air flowing through heat exchanger 20. Temperature conditioned process air exits heat exchanger 20 to filter 22, and used cooling air 21 exits heat exchanger 20 and is directed overboard. The flow of cooling air into heat exchanger 20 can optionally be controlled with a valve in order to control the temperature of the temperature conditioned air exiting heat exchanger 20 and entering ASM 24. The temperature of conditioned air exiting heat exchanger 20 is between about 60 degrees Fahrenheit (15 degrees Celsius) and about 200 degrees Fahrenheit (93.4 degrees Celsius).

Filter 22 removes dust, oil mists, or organics from incoming process air, depending on what kind of process air is being used. In some embodiments, filter 22 can be a plurality of filters for conditioning incoming process air. Filter 22 can be, for example, a mechanical separator, an ozone converter, a high efficiency particulate arrestance filter, or a gaseous contaminant removal system, depending on the type of membrane used in ASM 24 and the type of process air coming into system 10.

From filter 22, process air runs through compressed air inlet 23 into ASM 24. ASM 24 can be a membrane-based ASM with membrane 25, made of a polymer such as poly(1-trimethylsilyl-1-propyne), Teflon®, silicone rubber, poly(4-methyl-1-pentene), poly(phenylene oxide), ethyl cellulose, polyimide, polysulfone, polyaramide, tetrabromo bis polycarbonate, or combinations thereof. Membrane 25 of ASM 24 separates the incoming process air to generate NEA and OEA. NEA exits ASM 24 through NEA line 30 and is distributed to fuel tanks and other locations in the aircraft that require inert gas. OEA exits ASM 26 through variable vacuum source 26, and is dumped overboard or alternatively cycled to areas benefitting from oxygen-enriched air, such as the cabin, flight deck, or a combustor.

Variable vacuum source 26 is a vacuum source capable of providing a vacuum to ASM 24 for the purpose of creating an increased pressure differential across membrane 25 in ASM 24. Variable vacuum source 26 is in fluid connection with ASM 24 and draws OEA across membrane 25 to be sent overboard via OEA outlet 28. Variable vacuum source 26 can be, for example, a vacuum pump (discussed with reference to FIG. 3), a variable ejector, or an ejector array (discussed with reference to FIGS. 4A-4C). Additionally, the vacuum provided by variable vacuum source 26 is changeable in correlation with flight phase. For instance, variable vacuum source 26 can be run during cruise or top-of-descent at deeper vacuum in order to pre-load the fuel tank ullage with more pure NEA.

Nitrogen-enriched air line 30 receives NEA from ASM 24 and directs it toward a fuel tank or other location requiring inert gas. Pressure regulator 32 and oxygen sensor 34 are located in NEA air line. Pressure regulator 32 detects and regulates pressure of NEA before NEA is directed to the fuel tank.

Oxygen sensor 34 measures oxygen concentration of the NEA in NEA line 30. The concentration of oxygen in the NEA exiting ASM 24 is between about 1% and about 12%. In other embodiments, temperature, pressure, or other sensors can also be on NEA line 30. Downstream of oxygen sensor 34, NEA is routed to inert gas outlet 36, where NEA is directed to a fuel tank or other location requiring inert gas.

Overall, within system 10, process air enters at inlet 12 from air source 14. Process air is driven by compressor 18 through actuated valve 16, heat exchanger 20, and filter 22, where process air is regulated prior to entering ASM 24. In ASM 24, process air is separated into nitrogen-enriched air (NEA) and oxygen-enriched air (OEA) assisted by variable vacuum source 26. OEA exits out oxygen-enriched air outlet 28, while nitrogen-enriched air is directed through nitrogen-enriched air line 30. On nitrogen-enriched air line 30, pressure regulator 32 and oxygen sensor 34 regulate NEA prior to directing nitrogen-enriched air to inert gas outlet 36, where NEA is used to inert fuel tanks, for fire suppression, or for other inerting purposes. Controller 38 manipulates the function of system 10 based on data received from components with system 10.

Controller 38 allows for manipulation of components in system 10. Controller 38 can include one or more processors and computer-readable memory encoded with instructions that, when executed by the one or more processors, cause controller 38 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of controller 38 can be configured to store information within controller 38 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 38 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories. Controller 38 can be a stand-alone device dedicated to the operation of the catalytic oxidation unit, or it can be integrated with another controller.

In system 10, controller 38 is operatively coupled (e.g., electrically and/or communicatively) to components as depicted in FIG. 1 to send and/or receive data to control operation of these components. Controller 38 is connected to actuated valve 16, compressor 18, variable vacuum source 26, and oxygen sensor 34. Controller 38 can send and receive data from these components, and appropriately adjust functions of these components. Controller 38 can also send and receive data from other parts of the aircraft, such as flight phase data from the main control.

In particular, controller 38 can adjust the vacuum produced by variable vacuum source 26 based on the flight phase. Controller 38 can direct variable vacuum source 26 to turn on, turn off, or adjust the depth of vacuum produced by variable vacuum source 26, thus, manipulating the pressure differential across ASM 24 produced by the vacuum. Controller 38 can dictate the depth of vacuum based on, for example, the flight phase and the purity of NEA desired. In this instance, controller 38 can use data from oxygen sensor 34, in addition to data from fuel tanks, to determine how much NEA is needed to inert the fuel tanks. Controller 38 can, in turn, direct variable vacuum source 26 to increase or decrease the depth of vacuum produced based on this information.

In practice, the control of variable vacuum source 26 in conjunction with ASM 24 allows for the creation of a varying pressure differential across the membrane in ASM 24 as required by flight phase. For instance, during descent a large purity of inert gas is required to inert the fuel tanks in order to counteract the inrush of outside air into fuel tank vents as the pressure inside the fuel tanks equilibrates. During descent, the unoccupied volume in the fuel tanks becomes larger due to the consumption of fuel. A larger unoccupied volume in the fuel tanks exacerbates the challenge of generating sufficient NEA during descent. Instead of relying on a stream of bleed air from the engines that dictates the purity of inert gas ASM 24 can produce, controller 38 can direct variable vacuum source 26 to provide a vacuum and a larger pressure differential across ASM 24. This more effectively draws oxygen across the membrane and allows the production of a higher purity of NEA more quickly than otherwise possible. Thus, ASM 24 can produce a large purity of inert gas deeply depleted of oxygen at the top of descent to fill the ullage of the fuel tanks, prior to descent itself when that large purity of inert gas is needed, thereby enabling a physically smaller ASM to be used on board.

Additionally, controller 38 is operatively coupled with actuated valve 16 and compressor 18. Controller 38 can send a signal to actuated valve 16 and for example, to a variable speed motor drive associated with compressor 18 in order to alter the rate at which compressor 18 and actuated valve 16 feed process air into ASM 24. If, for instance, a large purity of inert gas is needed back on data from fuel tanks and oxygen sensor 34, controller 38 can make actuated valve 16 and compressor 18 function so as to insert more process air into ASM 24. In another exemplary embodiment, controller 38 sends a signal to compressor 18 to vary rotational speed and thus output pressure. The manipulation of components in system 10 by controller 38 allows for tailoring of inert gas production throughout aircraft flight.

Figure 2A:
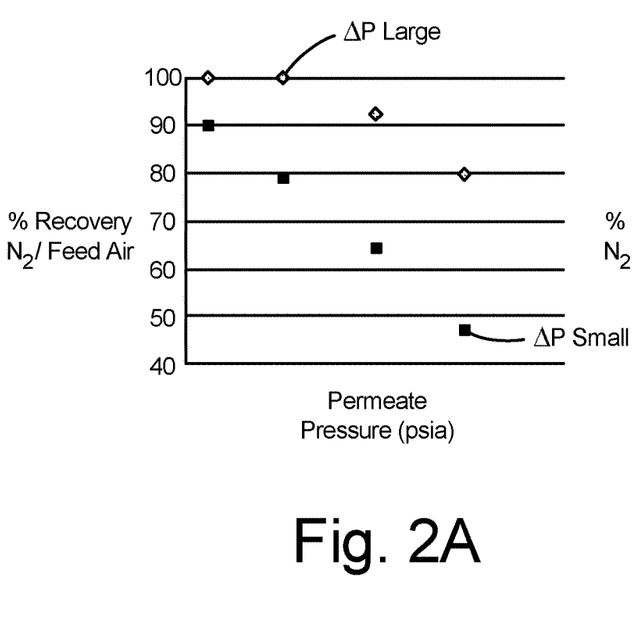
FIGS. 2A-2B are graphs showing the effect of pressure differentials on recovery of nitrogen-enriched air in fuel tank inerting systems.
Figure 2B:
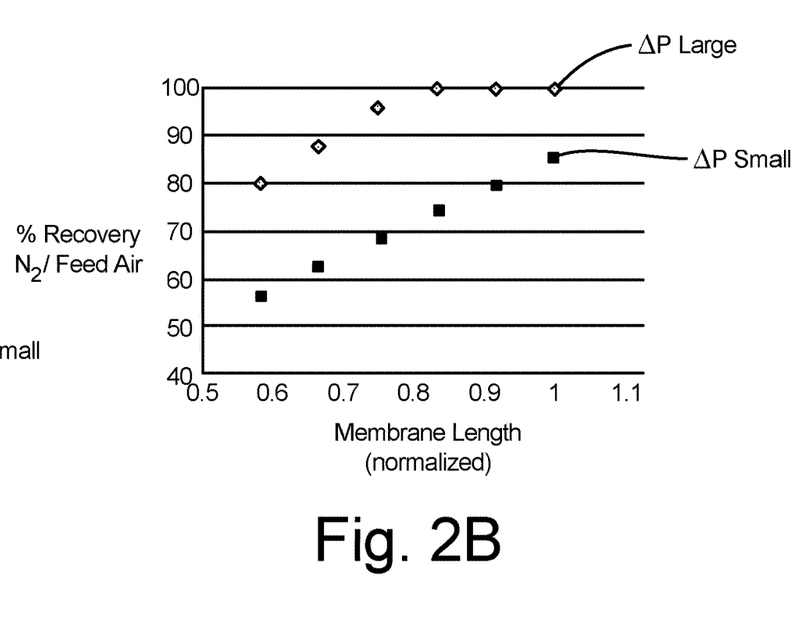

FIGS. 2A-2B are graphs showing the effect of high and low pressure differentials on recovery of nitrogen-enriched air in air separation module based fuel tank inerting systems. For purpose of FIGS. 2A-2B, feed air is the process air entering an air separation module for the purpose of producing inert gas. Air separation modules discussed herein are assumed to contain air separation membranes, which are selectively permeable to oxygen but relatively impermeable to nitrogen. Thus, on the permeate side of an air separation module membrane, oxygen ($O_2$), carbon dioxide ($CO_2$) and water vapor ($H_2O(g)$) are present, having migrated across the membrane, as well as a small purity of nitrogen ($N_2$). In contrast, on the retentate side of an air separation module membrane is predominantly nitrogen ($N_2$), and residual oxygen. The pressure differential across the air separation module membrane determines air separation module performance. The pressure differential is controlled by bleed air pressure entering the air separation module system, and by the permeate side pressure (combined $O_2$, $CO_2$, $H_2O(g)$). On an aircraft during cruise, ambient air has a lower pressure at altitude. This creates a natural vacuum to assist permeance of the membrane; the depth of vacuum can be further improved by a variable vacuum device.

FIG. 2A shows the percent recovery of nitrogen from the feed air versus the permeate pressure. FIG. 2A exhibits these results for both a membrane with a smaller pressure differential ($\Delta P$ Small) and a larger pressure differential ($\Delta P$ Large). Generally, the air separation module with a higher pressure differential and a lower permeate pressure had a substantially more efficient recovery of nitrogen from incoming feed air.

FIG. 2B shows the percent recovery of nitrogen from the feed air versus the membrane length (normalized). FIG. 2B exhibits these results for both a membrane with a smaller pressure differential ($\Delta P$ Small) and a larger pressure differential ($\Delta P$ Large). Like with FIG. 2A, the air separation module with a higher pressure differential had a substantially more efficient percentage recovery of nitrogen from incoming feed air. To increase the pressure differential across an air separation module membrane, a vacuum source can be attached to the air separation module to adjust the pressure on the permeate side of the membrane.

Figure 3:
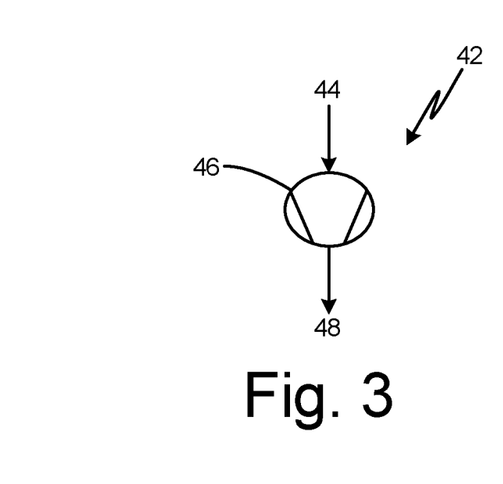
FIG. 3 is a schematic diagram of a vacuum pump for use with an air separation module.

FIG. 3 is a schematic diagram of vacuum pump assembly 42 for use with an air separation module. Vacuum pump assembly 42 can be used as variable vacuum source 26 in system 10, and functions by removing gaseous molecules from a sealed volume (in system 10, ASM 24). Vacuum pump assembly 42 includes suction inlet 44, vacuum pump 46, and discharge outlet 48.

Suction inlet 44 is connected to ASM 24 on the permeate side of the ASM membrane (the side on which OEA collects). Suction inlet 44 takes in OEA from ASM 24 and suctions OEA into vacuum pump 46. Discharge outlet 48 expels OEA from vacuum pump 46 out of OEA outlet 28.

Vacuum pump 46 functions by removing permeate gas molecules from ASM 24 and can be a diaphragm vacuum pump, a rocking piston vacuum pump, a scroll vacuum pump, a roots vacuum pump, a parallel screw vacuum pump, a claw type vacuum pump, or a rotary vane vacuum pump. Preferably, vacuum pump 46 is an oil-free vacuum pump. Vacuum pump 42 can be driven by various power sources, for example, an electric motor, mechanical power from the engine translated via shaft, belt or gears, a hydraulic motor, or pneumatic motor.

Using an oil-free vacuum pump in conjunction with the membrane in ASM 24 reduces the risk of unintentionally coating the membrane with oil, which degrades the performance of the membrane overtime. An oil free vacuum pump, such as vacuum pump 46, is relatively low maintenance. Additionally, vacuum pump 46 can be used even when propulsing engines are turned off, as such a vacuum pump does not require a compressed air source.

Figure 4A:
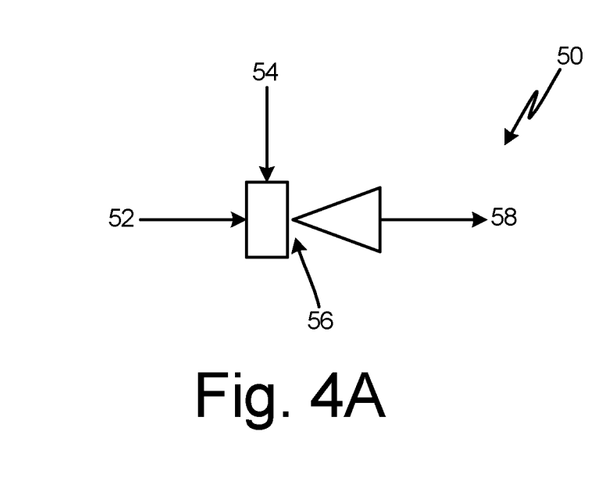
FIGS. 4A-4D are schematic diagrams of ejectors for use with an air separation module.
Figure 4B:
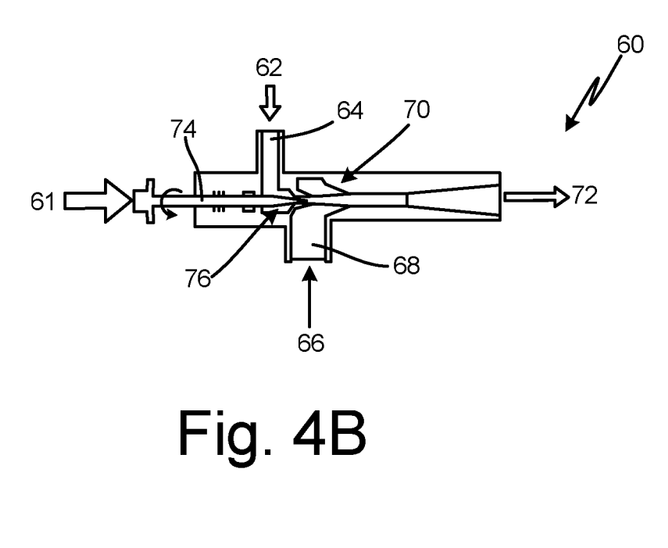
Figure 4C:
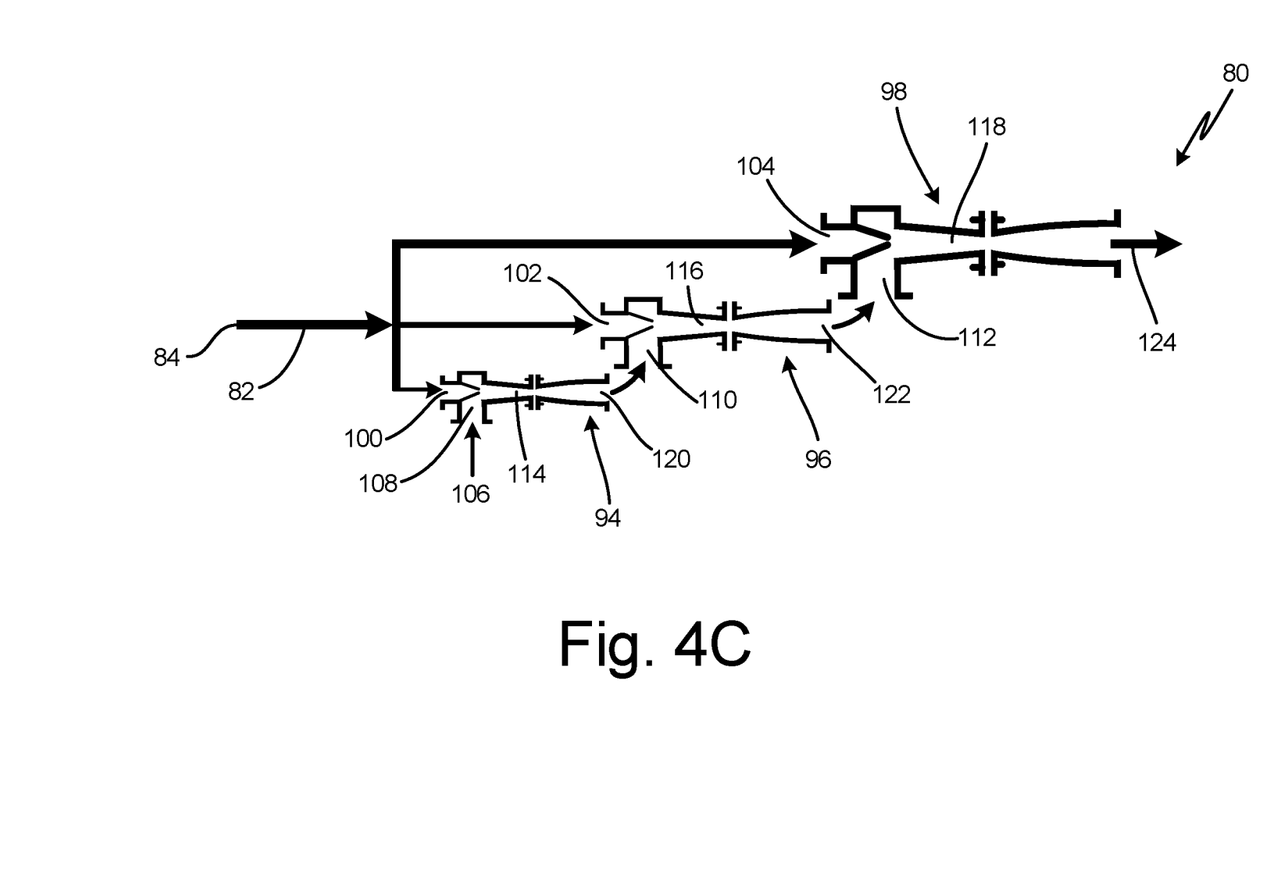

FIGS. 4A-4C are schematic diagrams of ejectors for use as variable vacuum source 26 in FIG. 1. FIG. 4A is a schematic diagram of ejector 50 (shown as a traditional symbol used in the industry) for use with an air separation module. Ejector 50 includes motive inlet 52, suction inlet 54, mixing section 56, and outlet 58.

Ejector 50 is a conventional ejector in which higher pressure motive fluid (e.g., compressed air) comes in motive inlet 52, accelerates through a constriction (throat), and flows to mixing section 56. A critical ejector with a fixed throat operates best when the motive fluid flow pressure is constant across all flight points. Meanwhile, suction fluid (OEA from ASM 24) enters suction inlet 54 due to the Bernouilli principle and flows to mixing section 56. The motive fluid from motive inlet 52 entrains the suction fluid from suction inlet 54, thereby pumping the suction fluid from suction inlet 54. Overall, fluid from motive inlet 52 and suction inlet 54 are mixed in mixing section 56, and discharged through outlet 58. Thus, ejector 50 performs similar to a vacuum pump, creating a vacuum.

Ejector 50 is an example of a simple ejector to create a greater pressure differential across the membrane in ASM 24 of FIG. 2. Ejector 50 can be a critical ejector (e.g., a sonic ejector) to create a deep vacuum. Alternatively, ejector 50 can be a non-critical (e.g., sub-sonic) for high secondary flow. Critical ejectors have a choked flow in throat and can reach deeper vacuums than non-critical ejectors. However, to create a variable vacuum across the membrane in ASM 24, and to operate with variable motive fluid pressure, an ejector with a variable throat can be used.

FIG. 4B is a schematic diagram of variable throat ejector 60 for use with an air separation module. Variable ejector 60 has motive fluid inlet 62 with motive fluid 64, suction fluid inlet 66 with suction fluid 68, mixing section 70, discharge outlet 72, and adjustable threaded screw 74 located in nozzle 76.

Variable ejector 60 functions similarly to ejector 50 of FIG. 4A. In variable ejector 60, motive fluid 64 (e.g., compressed air) flows into variable ejector 60 through motive fluid inlet 62. Suction fluid 68 (e.g., OEA from ASM 24) flows into variable ejector 60 through suction inlet 66. Motive fluid 64 and suction fluid 68 are conveyed to and mixed in mixing section 70, to create a vacuum applied to ASM 24. The fluids are discharged through discharger outlet 72.

However, in one embodiment of a variable ejector 60, adjustable threaded screw 74 can vary the cross sectional area of nozzle 76. For this reason, the amount of motive fluid 64 let into variable ejector 60 can be varied according to flight phase and vacuum needs. To allow adjustability, adjustable threaded screw 74 is sealingly and threadedly engaged to variable ejector 60 within nozzle 76, near motive fluid inlet 62. Depending on the position of adjustable threaded screw 74, more or less of motive fluid 64 is let into variable ejector 60. Typically, actuator 61 is connected to adjustable threaded screw 74 to change location of screw 74 and the cross section of nozzle 76. Actuator 61 could be connected to and controlled by a controller, such as controller 38 of system 10.

Thus, variable ejector 60 can be adjusted to provide different depths of vacuum depending on flight phase and feedback from the ASM system. Variable ejector 60 has a continuous turndown range, and does not require a separate pressure regulator, as the motive fluid pressure floats. Variable ejectors can be combined in series or parallel according to flow and vacuum requirements in the ASM system to create a deeper vacuum potential.

FIG. 4C is a schematic diagram of ejector array 80 for use with an air separation module. Ejector array 180 contains ejectors in series. In system 10 of FIG. 1, a single ejector cannot create a deep enough vacuum to serve as variable vacuum source 26 due to variation in motive fluid pressure and flow throughout the flight. Thus, an ejector array containing multiple ejectors, such as series ejector array 80, can be used in practice. Ejector array 80 includes motive fluid 82 entering through inlet 84, ejectors 94, 96, 98, motive fluid inlets 100, 102, 104, suction fluid 106 entering through suction fluid inlet 108, mixed fluid inlets 110, 112, mixing portions 114, 116, 118, ejector outlets 120, 122 and discharge outlet 124.

Motive fluid flow 82, similar to earlier discussed ejectors, can be compressed air. Motive fluid flow 82 enters ejector array 80 through main inlet 84, and flows to ejectors 94, 96, 98. Motive fluid 82 enters each individual ejectors 94, 96, 98, through individual motive fluid inlets 100, 102, 104, respectively. Consistent motive fluid pressure allows ejectors 94, 96, 98, to be sized optimally and perform consistently. Optionally, a pressure regulator can be used at inlet 84 to address variability in bleed pressure throughout the flight.

Suction fluid flow 106, similar to earlier discussed ejectors, can be OEA from ASM 24. Suction fluid flow 106 enters ejector array 80 through suction fluid inlet 108 of ejector 94, fluidly connected to the ASM. In ejector 94, suction fluid flow 106 and motive fluid flow 82 are conveyed to and mixed in mixing portion 114, and are discharged out of ejector outlet 120 to ejector 96.

Mixed motive fluid flow and suction fluid flow from ejector 94 flow into ejector 96 at mixed fluid inlet 110, and is conveyed to mixing portion 116 due to motive fluid 82 which is also conveyed through motive fluid inlet 102 to mixing portion 116, wherein motive fluid 82 is mixed with the fluid flow from ejector 94. The mixed fluid is expelled from ejector 94 through ejector outlet 122 towards mixed fluid inlet 112 of ejector 98.

Once received in ejector 98, the mixed fluid is flowed to mixing portion 118, where it is further mixed with more motive fluid 82 coming through motive fluid inlet 104. Finally, the mixed fluid is expelled downstream of mixing portion 118 through discharged outlet 124.

Optionally, the ejectors can be outfitted with variable throat areas and means to control them or with a valve system. This permits the ejectors to generate deep vacuum operating over a range of motive fluid pressure. With this configuration, all three ejectors can be in use, but one or more ejectors may be shut off by restricting the throat area of ejectors 94, 96, and 98 in order to conserve bleed air or to when a less deep vacuum is acceptable. If all the ejectors are in use, a deeper vacuum is formed and the pressure differential across the membrane in the ASM is greater. Adjusting the throat area of ejectors 94, 96, and 98 by, for instance, a controller, can adjust the vacuum produced by ejector array 80 depending on flight phase and ASM system specifications, such as the purity of inert gas already produced, the purity of inert gas needed to inert fuel tanks, and other parameters like pressure, temperature, and oxygen content of the inert gas.

Figure 4D:
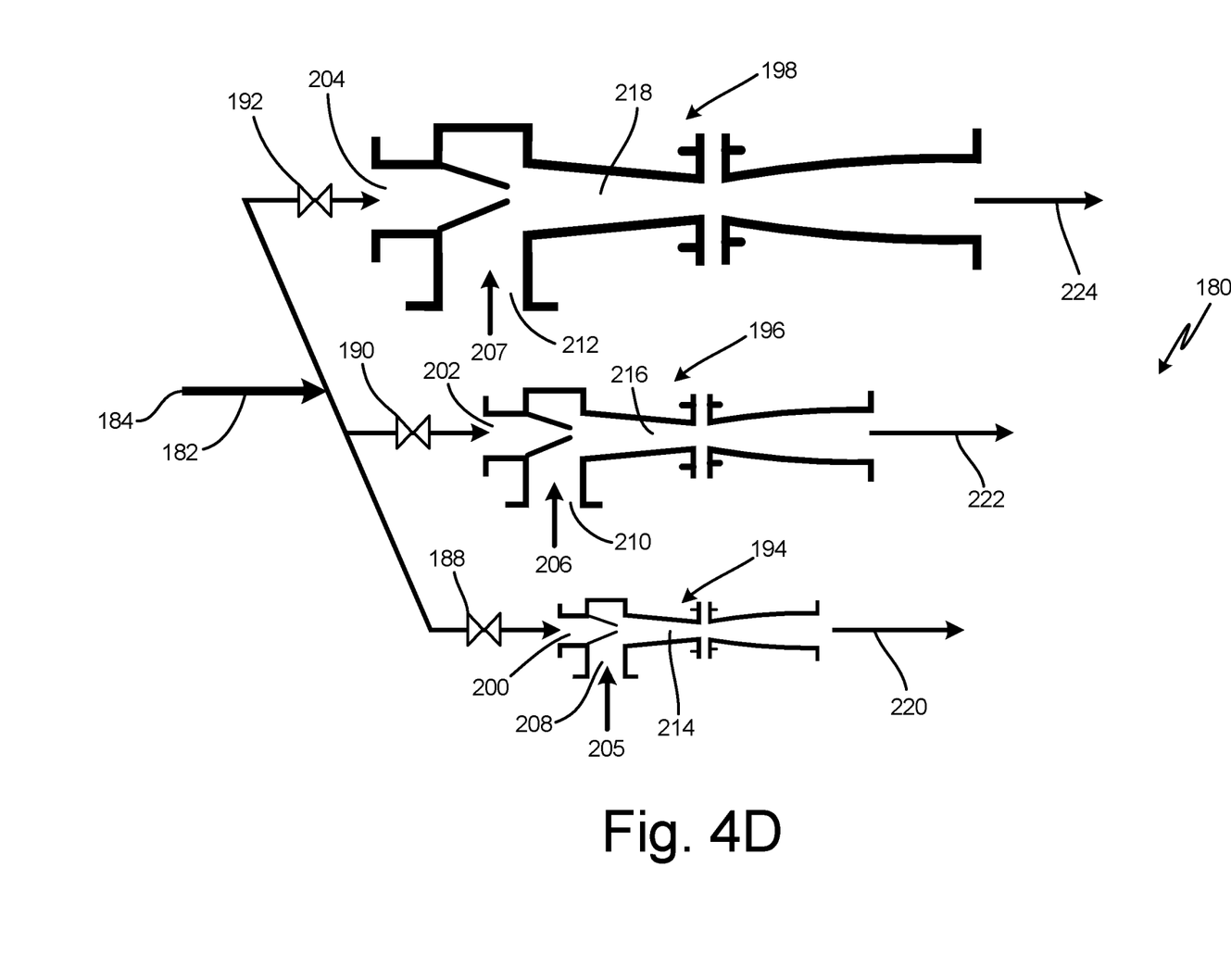

FIG. 4D is a schematic diagram of ejector array 180 for use with an air separation module. Ejector array 180 contains ejectors in parallel. In system 10 of FIG. 1, a single ejector cannot create a deep enough vacuum to serve as variable vacuum source 26 due to variation in motive fluid pressure and flow throughout the flight. Thus, an ejector array containing multiple ejectors, such as parallel ejector array 180, may be used in practice. Ejector array 180 includes motive fluid 182 entering through inlet 184, on/off valves 188, 190 and 192, ejectors 194, 196, 198, motive fluid inlets 200, 202, 204, suction fluid 205, 206, 207 entering through suction fluid inlets 208, 210, and 212, respectively, mixing portions 214, 216, 218, and ejector outlets 220, 222 and 224.

Motive fluid flow 182, similar to earlier discussed ejectors, can be compressed air. Motive fluid flow 182 enters ejector array 180 through inlet 184, and flows to ejectors 194, 196, 198 through on/off valves 188, 190 and 192. On/off valves 188, 190 and 192 can turn flow to ejectors 194, 196, and 198 on or off, respectively, depending on the needs of the aircraft and flight phase. Motive fluid 182 enters each individual ejectors 194, 196, 198, through individual motive fluid inlets 200, 202, 204, respectively.

Suction fluid flow 205, 206, 207, similar to earlier discussed ejectors, can be OEA from ASM 24. Suction fluid flow 205 enters ejector array 180 through suction fluid inlet 205 of ejector 194, fluidly connected to the ASM. In ejector 194, suction fluid and motive fluid flow 182 are conveyed to and mixed in mixing portion 214, and are discharged out of ejector outlet 220. Similarly, suction fluid flow 206 enters ejector 196 through suction fluid inlet 210, is mixed with motive fluid in mixing portion 216, and expelled through ejector outlet 222. Suction fluid flow 207 enters ejector 198 through suction fluid inlet 212, is mixed with motive fluid in mixing portion 218, and expelled through ejector outlet 224. Thus, each ejector 194, 196, 198, provides a vacuum.

In ejector array 180, each ejector 194, 196, 198 is sized differently to add varying amount of pressure to array 180 when in use. For example, ejector 194 can account for 20% of vacuum flow capacity, ejector 196 can account for 30% of vacuum flow capacity, and ejector 198 can account for 50% of vacuum flow capacity. Thus, if on/off valve 188 to ejector 194 is closed, ejector array 180 functions with 80% vacuum capacity. Likewise, if on/off valve 192 to ejector 198 is closed, ejector array 180 functions with 50% suction capacity. Ejector array 180 can be manipulated to provide varying vacuums to system 10 in this manner.

In ejector array 180, on/off valves 188, 190 and 192 may be removed by outfitting ejectors 194, 196, 198 with variable throat areas as discussed previously in association with FIG. 4B. This configuration confers improved ability to regulate suction fluid flow 106 by ejector array 180 more accurately over a wider range.

The use of a variable ejector array, or a vacuum pump, for a variable vacuum source to create a pressure differential across the membrane in an ASM allows for tailoring of inert gas production in aircraft. During cruise, or top-of-descent, where more inert gas is requiring in fuel tanks, the ullage of a fuel tank can be pre-loaded with NEA. This is due to the ability of a variable vacuum source to drive function of an ASM, even where bleed air is not available, or where typical ASM methodology is not available. Moreover, the purity of inert gas produced using the variable vacuum source in conjunction with an ASM can be tailored not just for fuel tank inerting (where less than 12% oxygen is desired), but also for fire suppression, where about 12-15% oxygen is desired for the purpose of biological compatibility.

Overall, using a variable vacuum source to manipulate the pressure differential across the membrane of an air separation module allows for better production of inert gas in desired quantity and concentration over a range of motive fluid pressure. Additionally, it allows for production of inert gas at cruise, top of descent, or on the ground, flight phases where air separation module systems are expected to struggle in future aircraft engine designs because of the low pressure bleed air produced by running aircraft engines.

Discussion of Possible Embodiments

The following are non-exclusive descriptions of possible embodiments of the present invention.

A fuel tank inerting system includes an air separation module having an oxygen permeable membrane that separates process air into nitrogen-enriched air and oxygen-enriched air, a variable vacuum source configured to produce a pressure differential across the oxygen permeable membrane, and a controller for controlling the variable vacuum source to provide the pressure differential such that a desired purity of the nitrogen-enriched air is produced.

The system of the preceding paragraph can optionally include, additionally and/or alternatively, any one or more of the following features, configurations and/or additional components:

The system includes a compressor upstream of the air separation module, the compressor configured to compress the process air.

The system includes a heat exchanger upstream of the air separation module, the heat exchanger configured to temperature control the process air.

The system includes a filter upstream of the air separation module, the filter configured to filter the process air.

The system includes a pressure regulator downstream of the air separation module, the pressure regulator configured to regulate the pressure of the nitrogen-enriched air.

The system includes an oxygen sensor downstream of the air separation module, the oxygen sensor configured to detect a concentration of oxygen in the nitrogen-enriched air.

The oxygen permeable membrane is selected from the group consisting of poly(1-trimethylsilyl-1-propyne), Teflon, silicone rubber, poly(4-methyl-1-pentene), poly(phenylene oxide), ethyl cellulose, polyimide, polysulfone, polyaramide, tetrabromo bis polycarbonate, and combinations thereof.

The variable vacuum source is a vacuum pump.

The vacuum pump is an oil-free vacuum pump.

The variable vacuum source comprises a variable throat ejector.

The variable vacuum source is an ejector array.

The variable vacuum source is a variable throat ejector array.

A method of fuel tank inerting includes separating process air into nitrogen-enriched air and oxygen-enriched air with an air separation membrane, applying a vacuum to the air separation membrane to produce a pressure differential across the air separation membrane, and manipulating the vacuum to vary the pressure differential and produce a varying purity of the nitrogen-enriched air.

The method of the preceding paragraph can optionally include, additionally and/or alternatively, any one or more of the following features, configurations and/or additional components:

The method includes compressing the process air.

The method includes temperature controlling the process air.

The method includes filtering the process air.

Manipulating the vacuum comprises adjusting the vacuum depth desired during flight phases.

Applying a vacuum comprises using a vacuum pump.

Applying a vacuum comprises using an ejector array.

Applying a vacuum comprises using at least one variable throat ejector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fuel tank inerting comprises:
regulating a flow of process air with an actuated valve;
separating the flow of process air into nitrogen-enriched air and oxygen-enriched air with an air separation membrane which is oxygen permeable;
applying, with a variable vacuum source, a vacuum to the air separation membrane to produce a pressure differential across the air separation membrane by permeating the oxygen-enriched air across the air separation membrane;
sensing, with an oxygen sensor in a nitrogen-enriched air line downstream of the air separation membrane, a concentration of oxygen in the nitrogen-enriched air;
adjusting, with a controller and a variable speed motor drive, the rate of flow of process air through the actuated valve, based on a concentration of oxygen in the nitrogen-enriched air detected by the oxygen sensor and data from at least one fuel tank; and
manipulating the vacuum with the controller, based on the concentration of oxygen in the nitrogen-enriched air detected by the oxygen sensor and the data from the at least one fuel tank sufficient to adjust the concentration of oxygen in the nitrogen-enriched air, to vary the pressure differential and produce a varying purity of the nitrogen-enriched air for fuel tank inerting.

2. The method of claim 1, further comprising compressing the process air.

3. The method of claim 1, further comprising temperature controlling the process air.

4. The method of claim 1, further comprising filtering the process air.

5. The method of claim 1, wherein manipulating the vacuum with the controller comprises adjusting the vacuum depth desired during flight phases of an aircraft.

6. The method of claim 1, wherein applying, with the variable vacuum source, the vacuum comprises using a vacuum pump.

7. The method of claim 1, wherein applying, with the variable vacuum source, the vacuum comprises using an ejector array.

8. The method of claim 1, wherein applying, with the variable vacuum source, the vacuum comprises using at least one variable throat ejector.

9. The method of claim 1, wherein manipulating the vacuum with the controller comprises operating, with the controller, the variable vacuum source during cruise and top-of-descent flight phases of the aircraft to pre-load fuel tank ullage with the nitrogen-enriched air before a descent flight phase of an aircraft.

10. The method of claim 1, wherein manipulating the vacuum with the controller comprises producing, with the controller, nitrogen-enriched air having an oxygen concentration of between 1% and 12% for fuel tank inerting.

\* \* \* \* \*